Sept. 4, 1956 A. GORDON 2,761,399
ICE CREAM DISHER
Filed Sept. 17, 1954
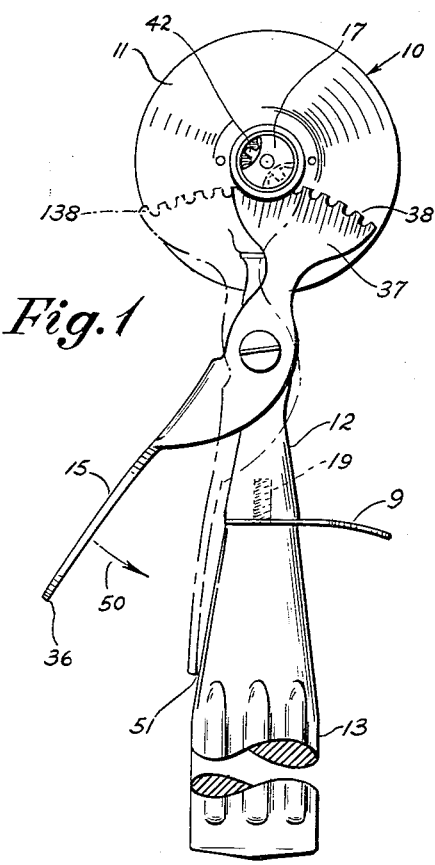
Fig.1
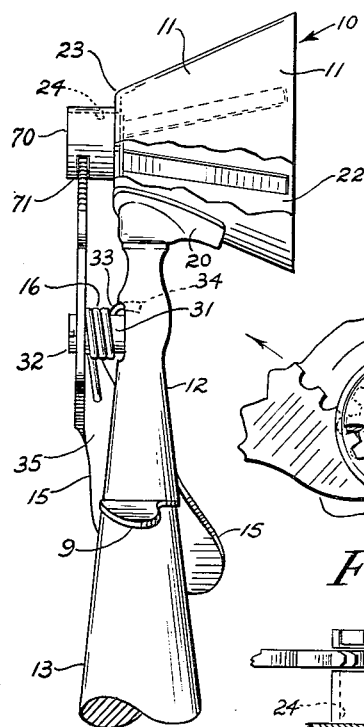
Fig.2
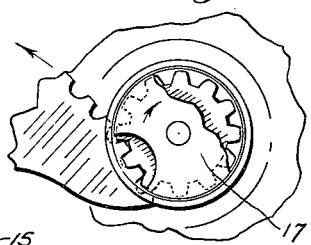
Fig.4
Fig.4a
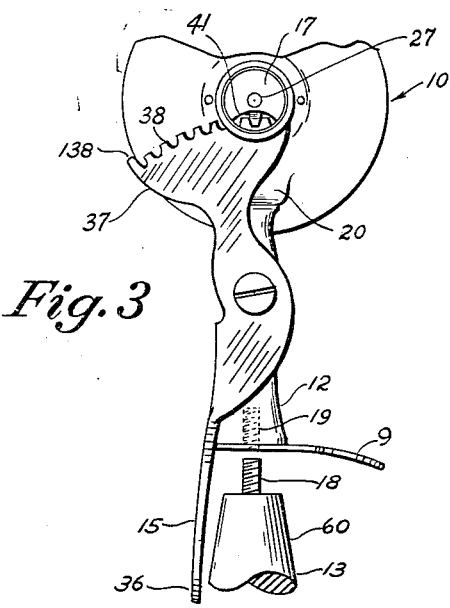
Fig.3
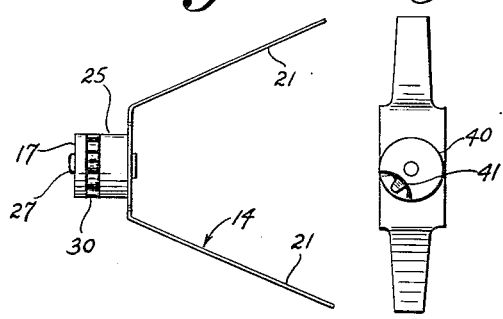
Fig.6  Fig.7
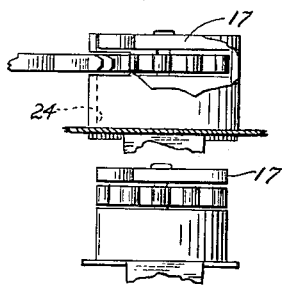
Fig.5

United States Patent Office 2,761,399
Patented Sept. 4, 1956

2,761,399
ICE CREAM DISHER

Anthony Gordon, New York, N. Y., assignor, by mesne assignments, to Ekco Products Company, Chicago, Ill., a corporation of Illinois Application September 17, 1954, Serial No. 456,782

5 Claims. (Cl. 107—48)

This invention relates generally to ice cream dishers, and more particularly to an improved construction thereof.

Ice cream dishers as known, frequently are of a construction having a scoop element and a knife or scraper element coacting therewith. The scraping element is caused to move within the scoop element by actuating means therefor in which a handle, manually operated, is urged to its starting position by a spring. For rapid and effective cleaning and other purposes, it is desirable that the device be capable of dismantling and reassembly in a convenient manner.

It is among the objects of the present invention to provide structure of the class described, wherein the ice cream disher may be quickly and conveniently dismantled and reassembled for the purpose of cleaning the same.

Another object herein lies in the provision of structure of the class described, in which although the parts are easily disassembled when this is desired, yet their accidental disassembly is prevented.

One of the disadvantages of prior known ice cream or similar dishers, lies in the fact that they are not easily disassembled for proper cleaning, a matter which has been the subject of objection by many, including health departments where the dishers are used for public dispensing of edibles. As is well-known in the art, such dishers are used to serve not only ice cream, ices and sherbets, but also other foods such as vegetables, hard sauce, mashed potatoes and the like.

Another object herein lies in a provision of a device of the class described which may have a long useful life, and which is relatively foolproof and trouble-free in operation.

Another object herein lies in the provision of structure of the class described, whereby the principal dismantling and reassembling for cleaning purposes may be accomplished without the use of any tools by a relatively unskilled worker.

These objects and other incidental ends and advantages will more fully appear in the progress of this disclosure and be pointed out in the appended claims.

In the drawing, in which similar reference characters designate corresponding parts throughout the several views:

Figure 1 is a fragmentary rear elevational view of a disher showing an embodiment of the invention.

Figure 2 is a fragmentary side elevational view, partly broken away, as might be seen from the right side of Figure 1.

Figure 3 is a fragmentary rear elevational view of the structure shown in Figure 1, with the handle disconnected and the operating lever in the knife and scraper element disengaging position.

Figure 4 is an enlarged fragmentary rear elevational view showing the rack and pinion and associated parts at the moment of disengagement, with the entire disher rotated through 45 degrees from the position shown in Figure 3.

Figure 4a is a fragmentary elevational view of Figure 4 as seen from below Figure 4.

Figure 5 is a fragmentary elevational view of the pinion and associated parts.

Figure 6 is a fragmentary elevational view of the knife and scraper element.

Figure 7 is an elevational view of the knife and scraper element as seen from the left in Figure 6.

In accordance with the invention, the disher 10 includes broadly a scoop element 11, a body 12, a handle 13, a knife and scraper element 14, an actuating element 15, a resilient element 16, and a locking member 17.

The scoop element 11 may be of a suitable shape, such as hemispherical (not shown) or conical. It is secured in any suitable manner, as by soldering to the support portion 20 of the body 12. The knife and scraper member 21 coacts with the inner surface 22 to dislodge the material contained within the scoop element in a well-known manner.

The handle 13 has a threaded shank 18 which threadedly engages a corresponding bore 19 in the body 12. Secured to the lower end of the body 12, as viewed in Figure 1, is a laterally extending finger piece 9.

Thus, by rotating the handle 13 about its axis, the threaded shank 18 will become disengaged from the threaded bore 19, but the finger piece 9 will remain connected to the body 12.

The scoop element 11 at the rear portion 23 thereof is provided with an opening forming a bearing 24 in which the hub 25 of the knife and scraper element is journaled.

The knife and scraper element 14 includes the hub 25, and may have a plurality of knife and scraper members 21. The latter are preferably formed from sheet metal by blanking and bending, and are connected to the hub 25 preferably by swaging 26 so that they are integrated with said hub. The hub has a rearwardly extending integral shaft 27 which is non-circular in cross-section and upon which are keyed the pinion element 30, and the locking member 17. When properly seated within the scoop element 11, the knife and scraper element 14 is adapted for rotation in both directions about the shaft 27 as an axis, and the members 21 contact the inner surface 22 for scraping or cutting the material being held by the disher.

Extending rearwardly from the body 12 is a boss 31 which is adapted at its outer end to receive the screw 32 which is provided with a shoulder (not shown) which serves as an axle for the rotation of the actuating element 15. Disposed about the boss 31 is the resilient element 16 preferably in the form of a helical spring, the forward or inner end 33 of which is anchored in a socket 34 in the body 12, while the outer or free end thereof engages against the inner surface 35 of the actuating element 15. The actuating element 15 is in the form of an elongated lever having the movable thumb piece 36 at its outer end and having an arcuate rack 37 at its outer end with a plurality of teeth 38.

The locking member 17 is preferably blanked from a planar piece of material and has an outer substantially arcuate edge 40, and a recessed or inner edge 41 which may also be arcuate in shape. The locking member 17 is maintained in relatively fixed relationship with respect to the pinion 30 by the heading over of the end of the shaft 27. The edge 40 is so arranged that it acts as an obstruction to prevent movement of the pinion axially or to the right as viewed in Figure 4, thereby preventing the teeth 38 of the rack 37 to be disengaged with respect to the pinion 30, while the recessed or inner edge 41 is sufficiently indented to allow one tooth 42 of the pinion element to pass rightwardly, as seen on Figure 4 of the device, sufficiently to disengage the teeth 38. Upon a pivotal movement, however, of the rack to the right or clockwise, as viewed on Figures 1 and 3, the pinion and the locking member 17 rotate so that the locking member lies clear of at least one of the teeth 38, thereby permitting movement of the knife and scraper element 14 to disengage the same from the remaining parts of the device.

The parts are so constructed and arranged so that the thumb piece 36 will strike against the handle 13 before the rack 37 shall have been rotated in a counter clockwise direction (as viewed in Figure 3) a sufficient distance to allow the rack and pinion to become disengaged.

The device, as viewed in Figure 1, shows the actuating element 15 in full lines in the normal or non-actuated position thereof to which it is urged by the action of the resilient element 16. In this position, the enlarged tooth 138 cannot mesh with the pinion, and so acts as a positive stop of the thumb piece member in a direction opposite to that of the arrow 50. With the parts in this position, the scoop element is dipped into the substance being dispensed and filled. Following this, the thumb piece 36 may be pushed by the user's thumb in the direction of the arrow 50 (Figure 1) until the parts take the position shown on the dot dash lines on Figure 1. In this position, the knife and scraper members will have rotated through more than 180 degrees so that all of the inner surfaces 22 will have been acted upon by them. The abutment at the point 51 of the outer end of the thumb piece 36 against the handle 13 will act as a stop to prevent the rack 37 from moving so far to the left, as viewed in Figure 1, as to have the inner edge 41 clear the outermost edges of the teeth 38. This position of the inner edge 41 is shown in the dot dash lines therefor on Figure 1.

When it is desired to disassemble the parts for cleaning, it becomes necessary only to remove the handle 13 whereupon the outer end of the thumb piece member 36 may move sufficiently to the right as shown in Figure 3 to enable the inner edge 41 to clear the outer edges of the rack 38.

Since the handle 13 acts as a stop to limit movement of the thumb piece 36 to the right, as viewed in Figure 3, it is feasible to correlate the taper 60 of the handle in such manner as sufficient clearance will be afforded to enable disassembly of the element 14 from the scoop element 12 by merely partially unscrewing the handle 60 without completely disconnecting the same from the bore 19. In such case the taper 60 functions as a camming surface.

The rear or outer end of the scoop element 11 is preferably provided with a guard element 70 in the form of a cylinder having a slot or cutout 71 location which the teeth 38 of the rack 37 may enter in order to engage the teeth of the pinion 30.

It may thus be seen that I have provided a novel and useful disher construction which is simple and effective. Disassembly and reasembly are quickly performed without skill or tooling.

I wish it to be understood that I do not desire to be limited to the exact details of construction shown and described, for obvious modifications will occur to a person skilled in the art to which the present invention relates.

I claim:

1. Disher construction comprising: a scoop element; a knife and scraper element movably associated with said scoop element; a pinion element connected to said knife and scraper element; a locking member having a recessed edge at a point on the periphery thereto positioned adjacent said pinion element and fixed in position with respect to said pinion element; an actuating element having a rack and movably mounted with respect to said scoop element and having a first engaging position in which said rack engages said pinion element between the locking member and the scoop element, and a second disengaging position in which the rack engages at least one tooth of said pinion element disposed adjacent said recessed edge of said locking member.

2. Disher construction comprising: a scoop element; a knife and scraper element journaled in and movably associated with said scoop element; pinion element connected to said knife and scraper element; a locking member positioned adjacent said pinion element and fixed in position with respect to said pinion element; said locking member having an outer edge and an inner recessed edge on the periphery thereof; an actuating element having a rack movably mounted with respect to said scoop element and having an active position in which said rack engages said pinion element between the locking member and the scoop element, and a disengaging position in which the rack engages at least one tooth of said pinion element disposed opposite said recessed edge of said locking member.

3. Disher construction comprising: a scoop element; a knife and scraper element movably associated with said scoop element; a pinion element connected to said knife and scraper element; a locking member having a recessed edge on the periphery thereof positioned adjacent said pinion element and fixed in position with respect to said pinion element; an actuating element having a rack and movably mounted with respect to said scoop element and having an active position in which said rack engages said pinion element between the locking member and the scoop element, and a disengaging position in which the rack engages at least one tooth of said pinion element disposed adjacent said recessed edge of said locking member; and a movable handle positioned to obstruct movement of said actuating member in its travel toward the disengaging position thereof.

4. Disher construction comprising: a scoop element; a knife and scraper element movably associated with said scoop element; a pinion element connected to said knife and scraper element; a locking member having a recessed edge on the periphery thereof positioned adjacent said pinion element and fixed in position with respect to said pinion element; an actuating element having a rack and movably mounted with respect to said scoop element and having an active position in which said rack engages said pinion element between the locking member and the scoop element, and a disengaging position in which the rack engages at least one tooth of said pinion element disposed adjacent said recessed edge of said locking member; and a movable handle positioned to obstruct movement of said actuating member in its travel toward the disengaging position thereof; said movable handle being threadedly connected to said scoop element.

5. Disher construction comprising: a scoop element; a knife and scraper element movably associated with said scoop element; a pinion element connected to said knife and scraper element; a locking member having a recessed edge on the periphery thereof positioned adjacent said pinion element and fixed in position with respect to said pinion element; an actuating element having a rack and movably mounted with respect to said scoop element and having an active position in which said rack engages said pinion element between the locking member and the scoop element, and a disengaging position in which the rack engages at least one tooth of said pinion element disposed adjacent said recessed edge of said locking member; and a movable handle positioned to obstruct movement of said actuating member in its travel toward the disengaging position thereof; said handle having a cam surface counteracting with said actuating element.

References Cited in the file of this patent

UNITED STATES PATENTS

| 697,677 | Sherer | Apr. 15, 1902 |
| 819,373 | Olmstead | May 1, 1906 |
| 833,620 | Nielsen | Oct. 16, 1906 |
| 1,132,657 | Gilchrist | Mar. 23, 1915 |